Sept. 23, 1958     R. T. BERGMAN     2,853,143
BATTERY HOLD-DOWN
Filed Nov. 13, 1956     2 Sheets-Sheet 1
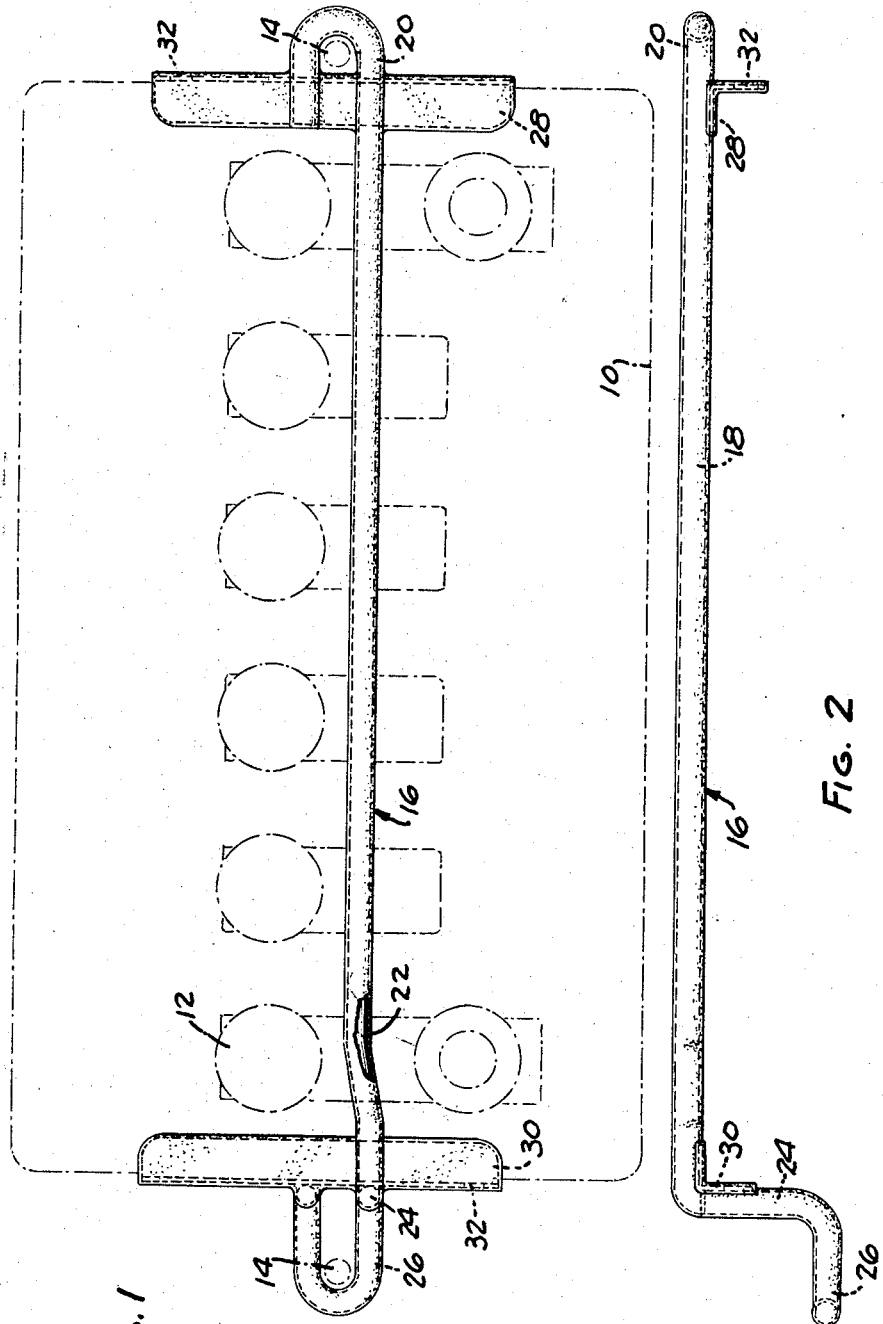
INVENTOR.
ROBERT T. BERGMAN
BY
ATTORNEYS.

Sept. 23, 1958 R. T. BERGMAN 2,853,143
BATTERY HOLD-DOWN
Filed Nov. 13, 1956 2 Sheets-Sheet 2

INVENTOR.
ROBERT T. BERGMAN
BY
Barnes, Kisselle Laughlin Raines
ATTORNEYS.

United States Patent Office 2,853,143
Patented Sept. 23, 1958

2,853,143

BATTERY HOLD-DOWN

Robert T. Bergman, Detroit, Mich., assignor to Automotive Rubber Company, Incorporated, Detroit, Mich., a corporation of Michigan Application November 13, 1956, Serial No. 621,611

2 Claims. (Cl. 180—68.5)

This invention relates to battery hold-down clamps for use particularly in automotive vehicles. Vehicular storage batteries are customarily mounted in a convenient location on the vehicle chassis where a suitable base or box is provided upon which the battery may be positioned. It has become fairly standard practice to provide a pair of vertically extended hold-down studs, one at either end of the battery receiving space. These studs may receive a hold-down clamp which lies over the top edge or corners of the battery and is clamped down by means of nut applied to the upending studs.

The usual vehicle battery is provided with a plurality of filler openings extending above the top. These are vented and are the source of acid contamination of any metallic parts which lie in their vicinity. Many times a battery also has exposed metallic connector bars lying along the top. It has accordingly been customary in the past to construct battery hold-down clamps so that the metal parts are as far removed from the central top area of the battery as possible. Customarily the metal members extend along the peripheral edge of the top of the battery. Nevertheless, considerable difficulty is experienced with corrosion due to the acid associated with the battery even with conventional hold-down clamps.

It is an object of the present invention to provide an improved battery hold-down clamp which will be more durable under the acid conditions present in the vicinity of vehicular batteries.

A further object is to provide a battery hold-down clamp of simple and inexpensive construction.

Another object is to provide a battery hold-down clamp in which a strong central member may extend along the top of the battery in close proximity to the filler caps and which is protected against acid deterioration by a heavy coating of rubber or similar plastic material.

It is another object of the invention to provide an improved battery hold-down clamp which will last for the life of the vehicle.

Another object is to provide a battery hold-down clamp with a coating of acid resisting rubber or similar material which not only serves to protect the metal parts of the clamp from corrosion, but serves as an insulator to prevent short-circuiting of the battery cells by contact with exposed connector bars.

Further objects of the invention will be apparent from the following description, reference being had to the accompanying drawing wherein two embodiments of the present invention are clearly shown.

Referring now to the drawing,

Figure 1 is a top view of the battery hold-down clamp incorporating one form of the present invention and showing the battery in dotted lines.

Figure 2 is a side view of the clamp shown in Figure 1.

Figures 3, 4:
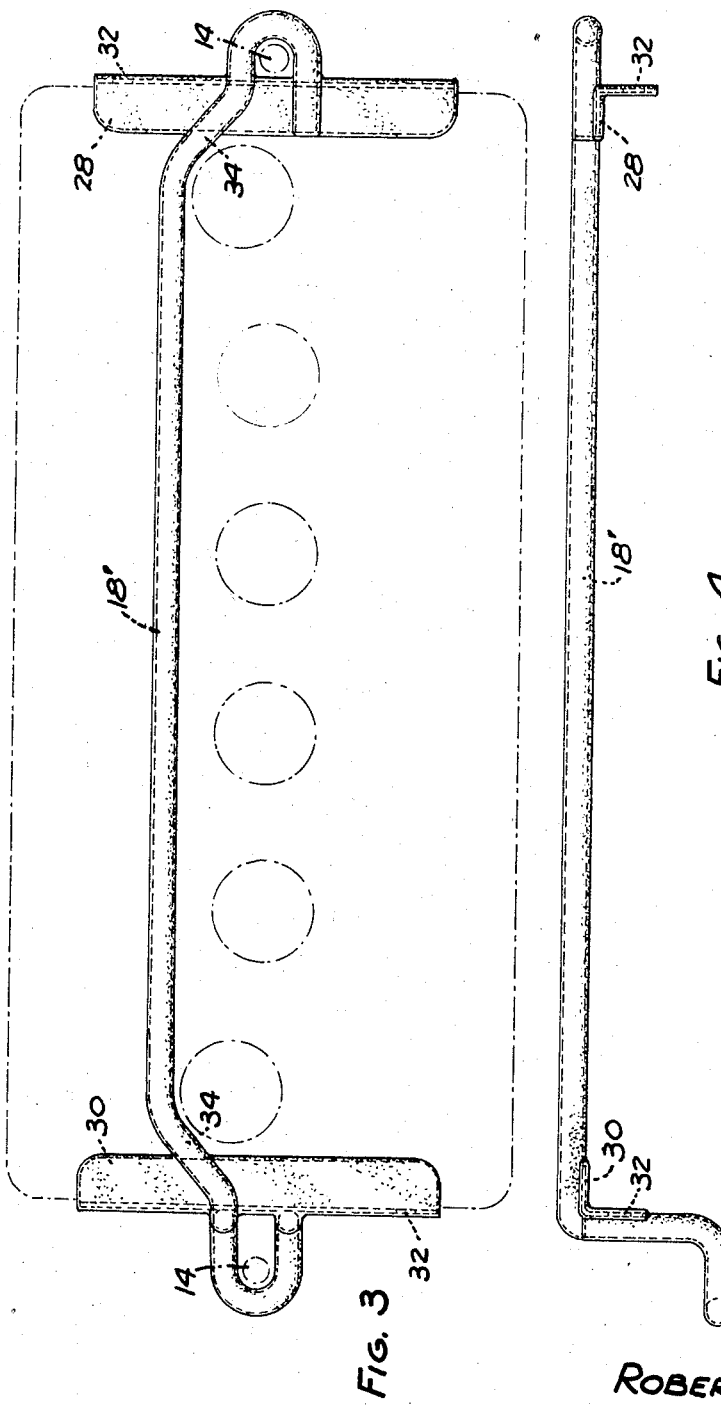
Figure 3 is a top view of a modified form of hold-down clamp showing the battery in dotted lines.
Figure 4 is a side view of the clamp shown in Figure 3.

Referring now to Figure 1, a six cell battery is indicated at 10 having filler caps 12 which project from the top surface thereof along the central longitudinal area. Vertically extended hold-down studs indicated at 14 lie at either end of the battery. The hold-down clamp generally designated as 16 comprises longitudinal bar 18 which in its preferred form is of a circular cross section. At its right-hand end the bar is provided with a return bend 20 which surrounds the stud 14 and forms a bolt receiving hole. Near its left-hand end the bar is provided with a slight offset shown at 22 and is bent vertically downwardly as indicated at 24 in Figure 2. The end of the bar is provided with another return bend 26 which forms a bolt receiving opening for the stud 14. Secured to the bar 18, as by welding, are a pair of cross pieces 28 and 30 which may be of identical construction. These are formed of angle iron or similar L-shaped material and spaced along the bar 18 so as to overlie the end top edges of the battery 10. One or both of the cross pieces may be provided with a hole shown at 32 for the purpose of hanging up the clamp during a subsequent dip coating operation. It will be obvious that the offset portion 24 serves to reinforce cross piece 30 while at the same time it places the ear formed by return bend 26 below the level of the top of the battery so that the nut of the attached bolt will not protrude upwardly above the battery.

The entire hold-down clamp is preferably coated with an acid resistant plastic such as rubber. For this purpose the clamp may be suspended in a dip coating process to build up a coating over the entire surface of the clamp to a thickness of approximately one-thirty-second (1/32) of an inch. By providing a separate hole for hooking up the clamp during this coating process, any break in the coating which might occur due to the detachment of the hook will be at a point where corrosion is not critical.

It will be seen that the clamp is a simple integral member in which the central bar 18 extends across the top of the battery and provides a strong clamping action due to the force applied through the studs 14. At the same time, the entire clamp structure is protected against corrosive effects of battery acid by the thick rubber coating. This coating also protects the battery against becoming shorted by reason of contact of the bar 18 with any projecting inter cell connecting bars.

In the form of the invention shown in Figures 3 and 4 the construction is similar to that shown in Figures 1 and 2 except that the longitudinal bar 18' is provided with a lateral offset by means of the two bend sections 34 at each end.

It will thus be seen that the present invention provides an improved battery hold-down clamp of simple and rugged construction which will have a long life under the corrosive conditions encountered in the vicinity of the vehicular battery. The longitudinal central member provides high strength at low cost and with a minimum amount of material. At the same time, the central member is protected against deterioration from acid spray and fumes and is also insulated against short-circuiting on the connector bars. Battery boxes vary from long and narrow to square boxes and it will be obvious that the bar of my battery hold-down clamp can extend lengthwise of the battery box, crosswise of the battery box or at any angle relative to two opposite walls.

While the form of embodiments of the invention as herein disclosed constitute preferred forms, it is to be understood that other forms might be adopted, all coming within the scope of the claims which follow.

What is claimed is:

1. A battery hold-down clamp for vehicular storage batteries of the type having a plurality of filler openings projecting from the top surface thereof comprising a horizontal bar positionable adjacent the top surface of the battery adjacent said filler openings, said bar having ears extending beyond the edges of the battery at its opposite ends with bolt-receiving openings therein, and a pair of cross members of L-shaped cross section for contacting top opposite edges of said battery and being of a length substantially greater than the width of the bar, said cross members being connected intermediate their ends to the bar near said ears.

2. A battery hold-down clamp for vehicular storage batteries of the type having a plurality of filler openings projecting from the top surface thereof comprising a horizontal bar positionable adjacent the top surface of the battery adjacent said filler openings, said bar having ears extending over and beyond the edges of the battery at its opposite ends with bolt-receiving openings therein, a pair of cross members of L-shaped cross section for contacting top opposite edges of said battery and being of a length substantially greater than the width of the bar, said cross members being secured intermediate their ends to the bar near said ears, and a thick coating of acid-resisting plastic material covering said bar and cross members.

References Cited in the file of this patent

UNITED STATES PATENTS

| | | |
|---|---|---|
| 2,181,304 | Lord | Nov. 28, 1939 |
| 2,402,682 | Shriro et al. | June 25, 1946 |

FOREIGN PATENTS

| | | |
|---|---|---|
| 824,443 | Germany | Dec. 10, 1951 |
| 647,562 | Great Britain | Oct. 26, 1948 |

Notice of Adverse Decision in Interference

In Interference No. 90,651 involving Patent No. 2,853,143, R. T. Bergman, Battery hold-down, final judgment adverse to the patentee was rendered Sept. 21, 1962, as to claims 1 and 2.

[*Official Gazette November 6, 1962.*]